April 3, 1951     J. E. TORREY ET AL     2,547,797
MILK FILTER
Filed Feb. 21, 1948     2 Sheets-Sheet 1
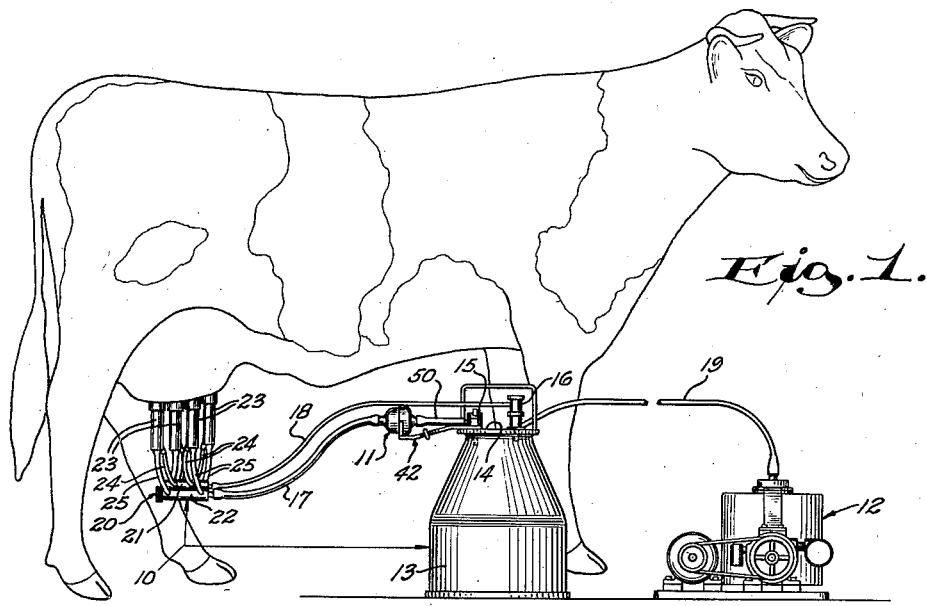
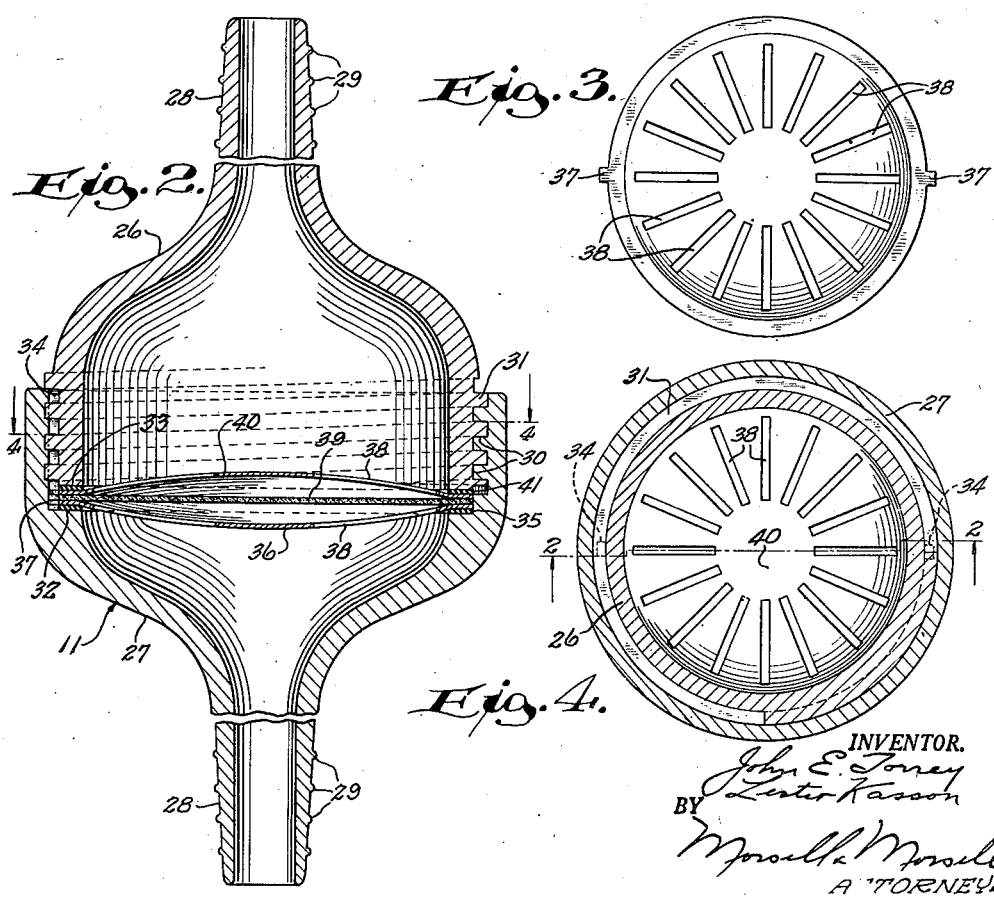

April 3, 1951  J. E. TORREY ET AL  2,547,797
MILK FILTER
Filed Feb. 21, 1948  2 Sheets—Sheet 2
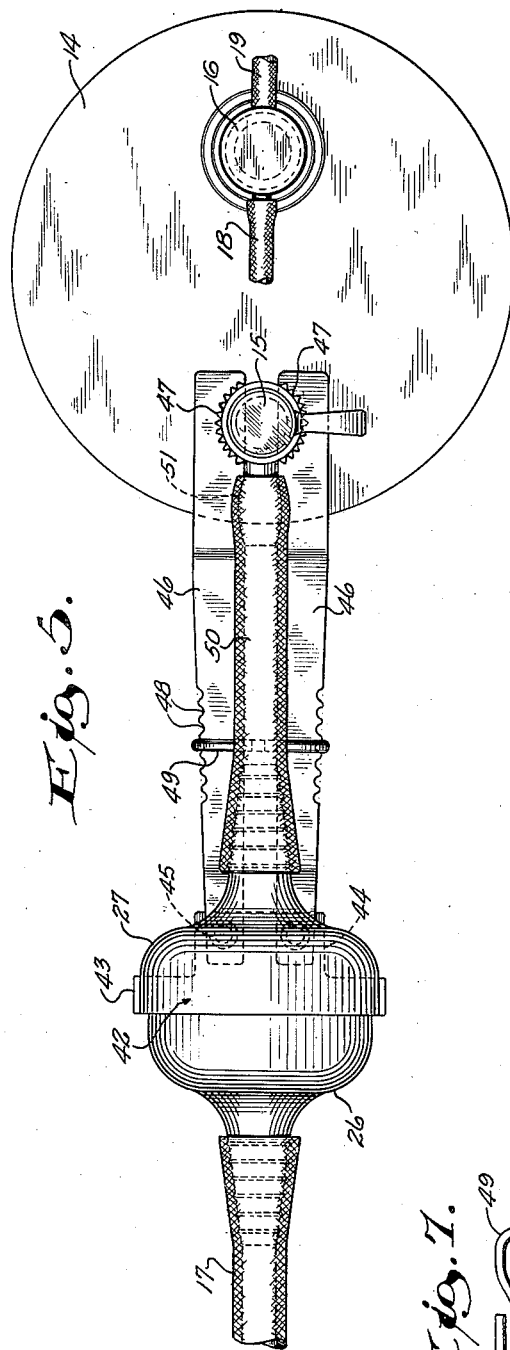
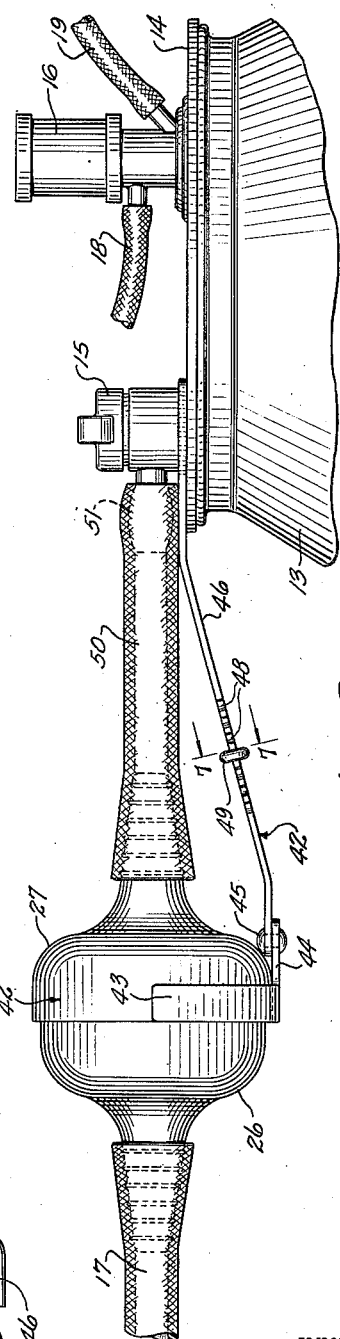
INVENTOR.
John E. Torrey
Lester Kasson
BY
Morsell & Morsell
ATTORNEYS.

Patented Apr. 3, 1951

2,547,797

UNITED STATES PATENT OFFICE 2,547,797

MILK FILTER

John E. Torrey, Shawano, and Lester Kasson, Clintonville, Wis.

Application February 21, 1948, Serial No. 10,116

7 Claims. (Cl. 210—164)

This invention relates to improvements in milk filters.

As a result of widespread farm modernization programs, the use of milking machines has replaced hand milking on practically all dairy farms. When machines are used the milk as it comes from the cow is collected in a special closed pail which is part of the milking machine equipment. When this pail becomes full, the milk is filtered into a standard milk can in which it is transported to market. The filter employed is usually the conventional type having an open bowl which is about thirty inches in diameter, and which supports a relatively thin filter pad of about six inches in diameter in a position interposed between and in immediate contact with a pair of flat perforated strainer plates. The filtering process is necessarily slow because gravity is relied upon to force the milk through the filter. In addition, since both sides of the filter pad are covered by the strainer plates, the effective filtering area of the pad is limited to the area of the perforations in said plates.

The abovementioned filtering operation is usually performed in the barn near the cows. During the operation of pouring the milk from the pail into the filter bowl and during the relatively slow filtering operation, the milk, being exposed to the surrounding atmosphere, is very susceptible to contamination from dust, insects, pets, or the like.

With the above in mind, it is a general object of the invention to provide a milk filter which is entirely enclosed, and which filters the milk as it comes from the cow without exposing said milk to the atmosphere and to the contaminating agents therein, either prior to or during the filtering operation.

A further object of the invention is to provide a milk filter wherein the filtering operation is accelerated by the use of a vacuum, and wherein as a result of said acceleration, a thicker, denser filter pad may be used to materially increase the efficiency of said filtering operation.

A further object of the invention is to provide a milk filter of the class described wherein the strainer plates thereof are formed with a concavo-convex contour and are positioned on either side of the filter in such a manner that the concave side of each plate faces the filter pad, whereby said pad is engaged by said plates at the periphery of the latter only. Thus, the entire area of the filter pad inwardly of said peripheral portion is effective in performing the filtering operation.

A further object of the invention is to provide a milk filter wherein movement of the strainer plates relative to each other is prevented, thereby avoiding the tearing or displacement of the filter pad during installation of said pad into the filter housing.

A further object of the invention is to provide a milk filter which may be quickly installed in the milk line of any of the conventional milking machines without requiring modifications of the machines and without requiring special tools or equipment for the installation.

A further object of the invention is to provide a milk filter of the class described which is very compact and which is therefore easily handled and cleaned.

A further object of the invention is to provide a milk filter which comprises a minimum number of component parts, which is inexpensive to manufacture, and which is otherwise well adapted for the purpose described.

With the above and other objects in view, the invention consists of the improved milk filter, and all of its parts and combinations, as set forth in the claims, and all equivalents thereof.

Referring more particularly to the drawing accompanying and forming a part of this specification, wherein the same reference characters represent the same parts in all of the views:

Fig. 1 is a perspective side view showing a conventional milking machine in position for operation and showing the improved milk filter installed in the main milk line of the milking machine;

Fig. 2 is an enlarged fragmentary longitudinal sectional view of the improved milk filter taken along the line 2—2 of Fig. 4;

Fig. 3 is a top view on a slightly smaller scale of a strainer plate of the type used in the improved milk filter;

Fig. 4 is a transverse sectional view of the improved filter on the same scale as Fig. 3 taken along the line 4—4 of Fig. 2;

Fig. 5 is a plan view of the improved filter in operative position and supported on a milking machine by a supporting bracket;

Fig. 6 is a side elevational view of the apparatus shown in Fig. 5; and

Fig. 7 is a transverse sectional view of the supporting bracket taken along the line 7—7 of Fig. 6.

Referring to Fig. 1 of the drawing, the numeral 10 indicates a conventional milking machine having associated therewith the improved filter 11 and a vacuum pump 12.

The milking machine 10 includes a pail 13 provided with a removable cover 14 which is formed to provide an airtight connection with said pail. Mounted on the cover 14 is a milk cock 15 and a pulsator 16. The milk cock 15 is in the form of a plug valve which is exteriorly connected to a main milk tube 17, and which is interiorly in communication with the interior of the pail 13. The pulsator 16 is exteriorly in connection with a vacuum tube 18 and with a vacuum tube 19 which leads to a source of vacuum, such as the electrically driven vacuum pump 12. The pulsator 16 is also in communication with the interior of the pail 13.

The vacuum tube 18 and the main milk tube 17 lead to the manifold unit 20 which is commonly called a claw. The claw 20 consists of a pair of cylinders, the smaller of which is the vacuum chamber 21 and the larger of which is the milk collector chamber 22. Four teat cups 23 are provided, each of which has a vacuum tube 24 and a milk tube 25. The vacuum tubes 24 of the teat cups are in communication with the vacuum chamber 21, and the milk tubes 25 are in communication with the collector chamber 22.

In operation of a conventional milking machine not equipped with the improved filter, the pulsator 16 changes the relatively constant vacuum created by the pump 12 to a pulsating vacuum, and the pulsating vacuum delivered to the teat cups 23 by the tubes 18 and 24 cause milk to be extracted from the udder of the cow being milked. The milk so extracted travels through the tubes 25 to the collector 22 and, since the interior of the pail 13 is in communication with the pulsator 16 and is for this reason also under vacuum, the milk is forced (by the vacuum existing in the main milk tube 17 and the pail 13) through the main milk tube 17 and into the pail 13.

When the pail 13 is filled, the top 14 thereof is removed and the milk therein is usually poured into an open bowl type of filter funnel as previously described. By the insertion of the improved filter unit 11 (to be hereinafter described) into the main milk line 17, the open bowl type of filter may be dispensed with.

The improved milk filter comprises a generally cylindrical housing made of stainless steel or other suitable material and formed of an upper shell 26 and a lower shell 27 (see Fig. 2). Each of the abovementioned shells is provided with a nipple extension 28 extending axially from the outer end thereof. The nipples 28 are formed with any suitable means such as the spaced circumferential ribs 29, which are adapted to maintain rubber tubing on the nipples 28. The interior of the lower shell 27, adjacent the upper margin thereof, is threaded as at 30, and the exterior of the upper shell 26 is threaded adjacent the lower margin thereof as at 31, the shells 26 and 27 being threadedly engageable as shown, to form a composite substantially cylindrical housing.

The interior of the lower shell 27 is formed with an annular shoulder 32 which is preferably of substantially the same width and diameter as the surface 33 of the lower end of the upper shell 26. Formed in the threaded surface 30 of the lower shell 27 are a pair of preferably diametrically oppositely positioned vertical slots 34 which are preferably rectangular in cross section. The slots 34 preferably have a depth less than that of the thread 30 and extend downwardly from the upper end of the lower housing 27 to the shoulder 32.

A substantially flat annular gasket 35 of rubber or other suitable material, having a width and diameter substantially equal to that of the shoulder 32, is positioned on said shoulder. Superimposed upon the gasket 35 is a lower strainer plate or disc 36. The disc 36 has an outside diameter substantially equal to the outer diameter of the gasket 35. Formed on diametrically opposite edge portions of the plate 36 are a pair of substantially rectangular outwardly extending locking lugs 37. The locking lugs 37 are adapted to fit into the slots 34, when the plate 36 is in operative position, to prevent rotation of the plate 36 relative to the lower shell 27. The plate 36 has a substantially flat rim portion which is in contact with the gasket 35. Inwardly of this flat rim the plate 36 curves downwardly, as shown in Fig. 2, to assume a concavo-convex contour in its central portion. In addition, the plate 36 is formed with a plurality of radial slots 38 to permit the passage of milk therethrough. As shown in Figs. 2, 3 and 4 the openings 38 are spaced from the center of the plate 36 to provide a centrally located imperforate area on each of said plates which is coaxial with the inlet and outlet connections 28.

Superimposed on the plate 36 is a circular filter pad 39 having a diameter substantially equal to that of the plate 36. Since the vacuum in the main milk line 17 will force the milk through the filter pad 39, a much denser and thicker filter pad may be used than is used in the conventional gravity filter, and consequently, greatly improved filtering can thereby be attained. In the conventional gravity filter, a filter pad is used which has a diameter of approximately six inches and which is composed of a thin layer of cellulose filtering material having a layer of gauze or cheesecloth for backing. Experience with the improved filter has shown that a filter pad composed of two layers of cotton flannel with a relatively thick layer of cotton batting or cellulose filtering material interposed therebetween does a superior filtering job without slowing down the milking operation.

An upper strainer plate 40 which is preferably identical to the plate 36 is superimposed on the filter pad 39 with its curved portion extending upwardly and with its locking lugs in the slots 34. An upper gasket 41, preferably identical to the lower gasket 35 is positioned on the flat rim of the upper plate 40. When the upper shell 26 is screwed into the lower shell 27, the lower surface 33 of the shell 26 and the shoulder 32 of the lower shell 27 tightly engage therebetween the gaskets 32 and 41, and the rim portions of the plates 36 and 40, as well as the outer marginal portions of the filter pad 39. When the shells 26 and 27 are thus connected, the threads 31 of the upper shell 26 entirely close off and seal the slots 30, as shown in Figs. 2 and 4. This feature is in addition to the sealing action of the gaskets 32 and 41 combined with that of the annular marginal portion of the filter pad 39. It is apparent, therefore, that when the housing of the improved filter is properly assembled, there exists a positive, air-tight seal between the shells 26 and 27 thereof.

It will be noted that when the improved filter is assembled, there is a lenticular space between the plates 36 and 40 created by the curvature of said plates. The filter pad 39, being engaged by said plates about its outer margin only, is free to flex like a diaphragm in response to fluctuations in pressure created by the pulsator 16.

This flexing of the filter pad 39 into and out of surface contact with the curved portions of the plates 36 and 40, permits effective filtering through the entire flexing area of said pad. This is in contrast to the limited effective filtering area which exists in the pad of a conventional gravity filter, wherein the filter pad is interposed between a pair of flat perforated strainer plates. In the latter type, only the area of the pad immediately under the upper strainer plate is available for effective filtering of the milk. The greater ratio of effective filtering area to total area, existing in a pad used in the improved filter, permits the use of a smaller diameter filter pad for the same rate of milk flow therethrough.

The combination of the locking lugs 37 and the slots 34 not only prevents rotation of the plates 36 and 40 relative to the lower shell 27, but, more important, it prevents movement of said plates relative to each other. By preventing relative movement of the plates, tearing or displacement of the filter pad 39 is prevented. In the absence of such a locking means, said tearing or displacement might otherwise occur while the shells 26 and 27 are being screwed together. Positive assurance that there will be no tearing or displacement of the filter pad 39 is necessary in order to maintain consistently high efficiency in the filtering unit. Without such assurance, the purity of the milk, and ultimately the public health, will be endangered.

The improved filter may be mounted in any suitable manner, such as by the supporting bracket 42 shown in Figs. 5 and 6. The bracket 42 consists of an arcuate band member 43 which is adapted to embrace the shell 27 about a peripheral portion thereof, as shown in Figs. 5 and 6. Integral with the band 43, and projecting from an intermediate portion thereof is a flat extension member 44 to which is pivotally connected, as by rivets 45, a pair of tapered supporting arms 46. The arms 46 are formed with opposing arcuate serrated concavities 47 adjacent their outer ends, and the taper of said arms extends from the outer ends toward the inner or pivoted ends. The outer edges of the arms 46 intermediate their length are formed with a series of notches 48. Adapted to be seated in an oppositely disposed pair of said notches is a wire clamping member 49. Movement of the clamping member 49 outwardly urges the outer ends of the arms 46 toward one another, and conversely, movement of the member 49 inwardly permits the outer ends of the arms 46 to be separated. The construction of the clamping member 49 is such that the spring action thereof will cause it to firmly seat itself in a pair of the oppositely disposed grooves 48 upon being moved outwardly along the arms 46.

The concavities 47 are adapted to engage the milk cock or other suitable projecting portion of the lid 14 of a conventional milking machine and when the concavities of the arms 46 engage the cock 15 and the clamping member 49 is moved to locking position, the bracket will support the improved filter in operative positions as shown in Figs. 5 and 6. A short section of rubber tubing 50 may be used to connect the improved filter with the milk cock nipple 51, and the main milk tube 17 of the conventional milking machine may be connected to the opposite end of the improved filter. It will be noted that the improved filter is equally effective whether the flow of milk therethrough is in one direction or the other.

In operation, the milk from the cow is forced through the main milk tube 17, through the improved filter 11 (see Fig. 1) and into the milk pail 13. The improved device filters all of the milk extracted from the cow as fast as it is extracted. No longer is it necessary to pour the milk from the milk can 13 into a large open bowl type of gravity filter, in order to filter the milk prior to its placement in a milk can for shipping. When the improved filter is used, there is but one pouring operation, i. e., that of pouring the filtered milk from the pail 13 into the shipping can. This pouring operation can be done quickly and in a small fraction of the time required for the milk to pass through a conventional gravity filter. Therefore, it will readily be seen that exposure of the milk to the atmosphere is reduced to a minimum by the use of the improved filter, and, in addition, the filtering operation is performed much faster and more efficiently.

The improved filter can be quickly disassembled and easily cleaned. Its compactness makes it particularly easy to handle, and its adaptability to any conventional milking machine without requiring expensive modifications thereof or special tools makes the improved filter especially desirable to the dairy farmer who wants the advantages of the improved filter with a minimum of investment.

Various changes and modifications may be made without departing from the spirit of the invention, and all of such changes are contemplated, as will come within the scope of the claims.

What we claim is:

1. A milk filter adapted to be inserted into the main milk line of a milking machine, comprising an enclosed housing having an inlet connection at one end and an outlet connection at the opposite end, a flexible filter pad extending transversely in said housing and positioned intermediate said inlet and outlet connections, a first strainer plate positioned adjacent one side of said filter pad and having a concavo-convex cross-sectional shape with the central portion thereof curved away from said pad, a second strainer of similar cross-sectional shape positioned adjacent the opposite side of said pad with its central portion curved away from said pad, said strainer plates clampingly engaging the periphery of said flexible filter pad, and said flexible pad being sufficiently flexible to provide for flexing movement into and out of surface contact with the curved inner surface of at least one of said strainer plates, and supporting means formed around the interior of said housing clampingly engaging the periphery of said plates.

2. A milk filter adapted to be inserted into the main milk line of a milking machine comprising a generally cylindrical enclosed composite housing which is formed of a pair of shells having end portions which engage each other, there being an inlet connection in the outer end of one of said shells and an outlet connection in the outer end of the other of said shells, a circular flexible filter pad extending transversely within one of said shells inwardly of the end connection thereof, a first circular strainer plate having a concavo-convex cross-sectional shape and being positioned adjacent one side of said filter pad with a central portion thereof curved away from said pad, a second circular strainer plate of similar cross-sectional shape positioned adjacent the opposite side of said filter pad with its central portion curved away from said pad, said strainer plates clampingly engaging the periphery of said flexible filter pad, and said flexible pad being sufficiently flexible to provide for flexing movement into and out of surface contact with the curved inner surface of at least one of said strainer plates, and means for separably maintaining said shells in assembled condition, there being annular supporting means around the interior of said shells for clampingly engaging the periphery of said plates when said filter is in assembled condition.

3. A milk filter adapted to be inserted into the main milk line of a milking machine comprising an enclosed composite housing which is formed of a pair of shells having end portions which engage each other, there being an inlet connection in the outer end of one of said shells and an outlet connection in the outer end of the other of said shells, a flexible filter pad extending transversely within one of said shells inwardly of the end connection thereof, a first strainer plate having a concavo-convex cross-sectional shape and being positioned adjacent one side of said filter pad with a central portion thereof curved away from said pad, a second strainer plate of similar cross-sectional shape positioned adjacent the opposite side of said filter pad with its central portion curved away from said pad, said strainer plates clampingly engaging the periphery of said flexible filter pad, and said flexible pad being sufficiently flexible to provide for flexing movement into and out of surface contact with the curved inner surface of either of said strainer plates, means for separably maintaining said shells in assembled condition, and means for preventing relative rotative movement of said plates, there being means including an annular shoulder on one of said shells for clampingly engaging the periphery of said plates when said filter is in assembled condition.

4. A milk filter adapted to be inserted into the main line of a milking machine of a type having means for causing fluctuations in pressure in said main milk line, comprising: an enclosed housing having an inlet connection at one end and an outlet connection at the opposite end; a pair of juxtaposed strainer plates extending transversely in said housing and positioned intermediate said inlet and outlet connections, at least one of said strainer plates having its central portion dished in a direction to provide a space between it and the other strainer plate; a flexible filter pad interposed between said strainer plates and having its periphery clampingly engaged between the peripheries of said strainer plates, said space between said strainer plates and within the line of clamping engagement being clear to permit flexing movement in said space of all portions of said pad within its clamped periphery; the dishing of the dished strainer plate being so limited in extent that the filter pad can flex into surface contact with the dished portion of said plate in response to fluctuations in pressure; said housing having means for clampingly engaging the strainer plates.

5. A milk filter adapted to be inserted into the main milk line of a milking machine of a type having means for causing fluctuations in pressure in said main milk line, comprising: an enclosed housing having an inlet connection at one end and an outlet connection at the opposite end; a pair of juxtaposed strainer plates extending transversely in said housing and positioned intermediate said inlet and outlet connections, the strainer plate nearest the outlet connection having its central portion dished in a direction to provide a space between it and the other strainer plate; a flexible filter pad interposed between said strainer plates and having its periphery clampingly engaged by the peripheries of said strainer plates, said space between said strainer plates and within the line of clamping engagement being clear to permit flexing movement in said space of all portions of said pad within its clamped periphery; the dishing of said dished strainer plate being so limited in extent that the filter pad can flex into surface contact with the dished portion of said plate in response to fluctuations in pressure; said housing having means for clampingly engaging said strainer plates.

6. A milk filter adapted to be inserted into the main milk line of a milking machine of a type having means for causing fluctuations in pressure in said main milk line, comprising: an enclosed housing having an inlet connection at one end and an outlet connection at the opposite end; a pair of juxtaposed strainer plates extending transversely in said housing and positioned intermediate said inlet and outlet connections, said strainer plates having central portions dished away from each other to provide a space therebetween; a flexible filter pad interposed between said strainer plates and having its periphery clampingly engaged by the peripheries of said strainer plates, said space between said strainer plates on each side of said pad and within the line of clamping engagement being clear to permit flexing movement in said space of all portions of said pad within its clamped periphery; the dishing of said strainer plates being so limited in extent that the filter pad can flex into surface contact with the dished portion of at least one of said plates in response to fluctuations in pressure; and said housing having means for clampingly engaging said strainer plates.

7. A milk filter adapted to be inserted into the main milk line of a milking machine comprising: an enclosed composite housing which is formed of a pair of shells having end portions which engage each other, there being an inlet connection in the outer end of one of said shells and an outlet connection in the outer end of the other of said shells, a flexible filter pad extending transversely in said housing and positioned intermediate said inlet and outlet connections, a first strainer plate positioned adjacent one side of said filter pad and having a concavo-convex cross-sectional shape with the central portion thereof curved away from said pad, a second strainer plate of similar cross-sectional shape positioned adjacent the opposite side of said pad with its central portion curved away from said pad, said strainer plates clampingly engaging the periphery of said flexible filter pad, and said flexible pad being sufficiently flexible to provide for flexing movement into and out of surface contact with the curved inner surface of either of said strainer plates, said shells having means for clampingly engaging the periphery of said strainer plates.

JOHN E. TORREY.
LESTER KASSON.

REFERENCES CITED

The following references are of record in the file of this patent:

UNITED STATES PATENTS

| Number | Name | Date |
|---|---|---|
| 275,978 | Barrington | Apr. 17, 1883 |
| 1,047,070 | Kantrowitz | Dec. 10, 1912 |

(Other references on following page)

UNITED STATES PATENTS

| Number | Name | Date |
|---|---|---|
| 1,102,685 | Proper | July 7, 1914 |
| 1,190,294 | Jonsson | July 11, 1916 |
| 1,202,723 | Jackson | Oct. 24, 1916 |
| 1,307,539 | Dinesen | June 24, 1919 |
| 1,703,440 | Duke | Feb. 26, 1929 |
| 1,849,672 | Jansson | Mar. 15, 1932 |
| 1,908,933 | Tinello | May 16, 1933 |
| 1,948,771 | Rucker | Feb. 27, 1934 |
| 2,059,636 | Flavin et al. | Nov. 3, 1936 |
| 2,202,403 | Sandberg | May 28, 1940 |
| 2,288,532 | Knapp | June 30, 1942 |
| 2,367,794 | Marselus | Jan. 23, 1945 |
| 2,389,185 | Dick | Nov. 20, 1945 |

FOREIGN PATENTS

| Number | Country | Date |
|---|---|---|
| 204,479 | Great Britain | Oct. 4, 1923 |
| 223,000 | Great Britain | Oct. 16, 1924 |
| 321,059 | Great Britain | Oct. 31, 1929 |